United States Patent [19]

Shibata et al.

[11] Patent Number: 5,391,687
[45] Date of Patent: Feb. 21, 1995

[54] METHOD OF PRODUCING HIGH MOLECULAR WEIGHT EPOXY RESIN USING AN AMIDE SOLVENT

[75] Inventors: Katsuji Shibata, Shimotsuma; Kazuhito Kobayashi, Yuki; Nozomu Takano, Shimodate; Masami Arai, Shimodate; Ikuo Hoshi, Shimodate, all of Japan

[73] Assignee: Hitachi Chemical Company Ltd., Tokyo, Japan

[21] Appl. No.: 137,229

[22] Filed: Oct. 18, 1993

Related U.S. Application Data

[63] Continuation of Ser. No. 757,314, Sep. 19, 1991, abandoned.

[30] Foreign Application Priority Data

| Sep. 10, 1990 | [JP] | Japan | 2-239398 |
| Sep. 10, 1990 | [JP] | Japan | 2-239399 |
| Sep. 10, 1990 | [JP] | Japan | 2-239400 |
| Sep. 12, 1990 | [JP] | Japan | 2-242238 |
| Sep. 12, 1990 | [JP] | Japan | 2-242239 |

[51] Int. Cl.$^6$ .............. C08G 59/62; C08G 59/56; C08G 59/68
[52] U.S. Cl. ................ 528/88; 528/89; 528/90; 528/91; 528/92; 528/93; 528/94; 528/95; 528/104; 525/523
[58] Field of Search ............... 528/88, 89, 90, 91, 528/92, 93, 94, 95, 104; 525/523

[56] References Cited

U.S. PATENT DOCUMENTS

| 3,006,892 | 10/1961 | Nikles | 525/523 |
| 3,306,872 | 2/1967 | Maycock et al. | 528/104 |
| 4,675,373 | 6/1987 | Yatsu et al. | 528/103 |

FOREIGN PATENT DOCUMENTS 0249262 12/1987 European Pat. Off.
2229728 12/1974 France.

OTHER PUBLICATIONS

Database WPIL, Week 8929, Derwent Publications Ltd., London, GB; AN 89-211518.

*Primary Examiner*—Frederick Krass
*Attorney, Agent, or Firm*—Antonelli, Terry, Stout & Kraus

[57] ABSTRACT

Ultra high molecular weight epoxy resins are produced in a short time by polymerizing a difunctional epoxy resin having two epoxy group per molecule and a dihydric phenol by heating the difunctional epoxy resin and the dihydric phenol which are present in quantities which provide a ratio of phenolic hydroxyl groups to epoxy groups of from 1:0.9 to 1:1.1, in an amide solvent, in the presence of a polymerization catalyst, and the ultra high molecular weight epoxy resins are linearly polymerized so highly as to have the capability of being formed into films having high strength.

13 Claims, No Drawings

METHOD OF PRODUCING HIGH MOLECULAR WEIGHT EPOXY RESIN USING AN AMIDE SOLVENT

This application is a continuation application of application Ser. No. 757,314, filed Sep. 10, 1991, now abandoned

BACKGROUND OF THE INVENTION (a) Field of the Invention

The present invention relates to a method of producing a high molecular weight epoxy resin which may be suitably used as a material for adhesives, insulating materials, paints, molded articles and films.

(b) Description of the Related Art

The method of producing high molecular weight epoxy resins by employing relatively low molecular weight difunctional epoxy resins and dihydric phenols as polymerization materials is generally called two-stage method, and the first literature on this method is the specification of U.S. Pat. No. 2,615,008 which corresponds to the published specification of Japanese Patent Application filed by the same applicant as the assignee of the U.S. Patent and published under publication No. 28-4494. In these literatures disclosed is a method of producing a higher molecular weight epoxy resin having an epoxy equivalent weight of 5,600 by carrying out a reaction at 150° to 200° C. in the absence of solvents by using sodium hydroxide as a copolymerizing catalyst. The average molecular weight or tile obtained epoxy resin is presumed to be about 11,000. In these literatures, however, there is no example where solvents are used.

An example of the literatures in which the use of solvents is disclosed is the specification of U.S. Pat. No. 3,306,872. Particular examples of the literatures in which the Use of solvents in working examples is disclosed include Japanese Patent Application Kokai Koho (Laid-open) No. 54-52200, Japanese Patent Application Kokai Koho (Laid-open) No. 60-118757, Japanese Patent Application Kokai Koho (Laid-open) No. 60-118757, Japanese Patent Application Kokai Koho (Laid-open) No. 60-144323 and Japanese Patent Application Kokai Koho (Laid-open) No. 60-114324. The solvents used in these literatures include methyl ethyl ketone, methyl isobutyl ketone, cyclohexanone, ethylene glycol monoethyl ether and ethylene glycol monomethyl ether. These solvents are classified into ketone solvents and ether (cellosolve) solvents.

In the specification of U.S. Pat. No. 3,306,872, either methyl ethyl ketone or ethylene glycol monomethyl ether is used as a solvent, and the concentration of the solids content is 20 to 60% by weight. The catalysts used therein are hydroxides and phenolates of alkyl metals and benzyltrimethylammonium. The polymerization reaction is continued at a temperature of 75° to 150° C. until the weight average molecular weights of the formed high molecular weight epoxy resins increase to at least 40,000 or more. The average molecular weights of the obtained high molecular weight epoxy resins are measured by the viscosity method to be 50,000 to 1,000,000. However, it is known that, in the viscosity method, the calculated average molecular weights are very dependent on the parameters established for the calculation, and therefore the average molecular weights of the high molecular weight epoxy resins produced In the U.S. Pat. No. 3,306,872 are not entirely accurate.

Another working example wherein a high molecular weight epoxy resin is supposed to be obtained by carrying out the polymerization in a solvent is disclosed in Japanese Patent Application Kokai Koho (Laid-open) No. 54-52200, in which it is disclosed that a high molecular weight epoxy resin having an average molecular weight of 45,500 is obtained by using ethylene glycol monoethyl ether as a solvent. Further, it is disclosed in Japanese Patent Application Kokai Koho (Laid-open) No. 60-118757 that high molecular weight epoxy resins having average molecular weights of at most 31,000 are obtained by using methyl isobutyl ketone, cyclohexanone or ethylene glycol monoethyl ether as a solvent. In Japanese Patent Application Kokai Koho (Laid-open) No. 60-144323 disclosed is the production of a high molecular weight epoxy resin having an average molecular weight of 53,200 by tile use of methyl ethyl ketone as a solvent, and in Japanese Patent Application Kokai Koho (Laid-open) No. 60-144324 disclosed is the production of a high molecular weight epoxy resin having an average molecular weight of 66,000 by the use of methyl ethyl ketone as a solvent. In every one of these four literatures, the average molecular weights are measured by gel permeation chromatography, but the measuring conditions and the calculation methods are not disclosed. The molecular weights measured by gel permeation chromatography vary largely depending on the measuring conditions including the kinds of the fillers used and the kinds of the eluents used and the calculating methods so that it is difficult to obtain accurate average molecular weights, and therefore the determined values of the average molecular weights of the high molecular weight epoxy resins produced in these literatures are not entirely accurate.

Further, none of the literatures described above disclose that the obtained high molecular weight epoxy resins are able to be formed into film. Also, since the obtained epoxy resins are soluble in the solvents other than amide solvents, it is apparent that the methods disclosed in these literatures could not provide so called ultra high molecular weight epoxy resins which are linearly polymerized so highly as to have the capability of being formed into films having sufficient strength.

Furthermore, the conventional methods involve the problem that the production of high molecular weight epoxy resins in the conventional polymerization solvents takes a good long reaction time. In many of the working examples disclosed in tile literatures described above wherein ketone or ether solvents are used as the solvents, the polymerization reaction takes 10 to 24 hours, which is extremely longer than the reaction time of 1.5 to 10 hours taken by the polymerization in the absence of solvents.

SUMMARY OF THE INVENTION

The object of the present Invention is to provide a method which can produce In an extremely short time ultra high molecular weight epoxy resins which have never been provided by the conventional methods and are linearly polymerized so highly as to have the capability of being formed into films having sufficient strength.

That is, the present Invention provides a method of producing a high molecular weight epoxy resin, comprising polymerizing a difunctional epoxy resin having two epoxy groups per molecule and a dihydric phenol by heating the difunctional epoxy resin and tile dihydric phenol which are present In quantities which provide a ratio of phenolic hydroxyl groups to epoxy groups of from 1:0.9 to 1:1.1, in an amide solvent, in the presence of a polymerization catalyst.

THE PREFERRED EMBODIMENTS OF THE INVENTION

The difunctional epoxy resin to be used in the present invention may be any compound as far as it contains two epoxy groups per molecule, and some examples include bisphenol A epoxy resin, bisphenol F epoxy resin, bisphenol S epoxy resin, alicyclic epoxy resins, aliphatic linear epoxy resins, diglcidyl ethers of dihydric phenols, diglycidyl ethers of dihydric alcohols, halides thereof and hydrides thereof. The molecular weights of these compounds are not limited. These compounds maybe used individually or as a mixture of two or more of them. Some ingredients other than the difunctional epoxy resin may be contained as impurities so far as they do not affect the operation and accomplishment of the present invention.

The preferred example of the difunctional epoxy resin is bisphenol A epoxy resin.

The dihydric phenol to be used in the present invention may be any compound as far as it contains two phenolic hydroxyl groups per molecule, and some examples include monocyclic dihydric phenols, such as hydroquinone, resorcinol and catechol, polycyclic dihydric phenols, such as bisphenol A, bisphenol F, naphthalenediols, halides thereof and alkyl substituted compounds thereof. The molecular weights of these compounds are not limited. These compounds may be used individually or as a mixture of two or more of them. Some ingredients other than the dihydric phenol may be contained as impurities as far as they do not affect the operation and accomplishment of the present invention.

When naphthalenediols are used as the dihydric phenol, high molecular weight epoxy resins having high glass transition temperatures are obtained. Examples of the naphthalene diols include 1,4-naphthalenediol, 1,5-naphthalenediol, 1,6-naphthalenediol, 1,7-naphthalenediol, 2,7-naphthalenediol, halides thereof and alkyl substituted compounds thereof. The preferred examples are 1,5-naphthalenediol and 1,7-naphthalenediol.

The preferred examples of the dihydric phenol are hydroquinone, resorcinol, bisphenol A, 1,5-naphthalenediol and 1,7-naphthalenediol.

The catalyst to be used in the present invention may be any compound as far as it has the catalytic function of accelerating the etherification between the epoxy groups and the phenolic hydroxyl groups. Some examples of the catalyst include alkali metal compounds, alkaline-earth metal compounds, imidazoles, organic phosphorus compounds such as alkyl phosphines, alicyclic amines and quarternary ammonium salts. The preferred are alkali metal compounds, alkyl phosphines and alicyclic amines.

Among these, the most preferred catalysts are alkali metal compounds, such as hydroxides, halides, organic acid salts, alcoholates, phenolates, hydrides, borohydride and amides of sodium, lithium and potassium.

Examples of the organic phosphorus compounds include phosphines containing lower alkyl groups, such as tri-n-butylphosphine and tri-n-propylphosphine.

Examples of the alicyclic amines include 1,4-diazabicyclo[2.2.2] octane, 1,5-diazabicyclo[4.3.0]-5-nonene The particularly preferred catalysts are sodium hydroxide, lithium hydroxide, sodium methoxide, lithium methoxide, sodium borohydride, tri-n-propylphosphine, 1,8-diazabicyclo[5.4.0]-7-undecene and 1,5-diazabicyclo[4.3.0]-5-nonene.

These catalysts may be used individually or as a mixture of two or more of them.

The amide solvent to be used In the present invention may be any amide solvent as far as it dissolves the difunctional epoxy resin and the dihydric phenol which are used as the materials, and some examples of the amide solvent include formamide, N-methylformamide. N,N-dimethylformamide, acetamide, N-methylacetate, N,N-dimethylacetamide, N,N,N',N'-tetramethylurea, 2-pyrrolidone, N-methylpyrrolidone and carbamates. The preferred examples are N,N-dimethylformamide, N,N-dimethylacetamide and N-methylpyrrolidone. These amide solvents may be used individually or as a mixture of two or more of them. Further, these amide solvents may be used together with other solvents, such as ketone solvents and ether solvents, as far as the operation and accomplishment of the present invention are not affected.

As to the reaction conditions in the present invention, the difunctional epoxy resin and the dihydric phenol which are used in quantities which provide a ratio of phenolic hydroxyl groups to epoxy groups of from 1:0.9 to 1:1.1. When the ratio of phenolic hydroxyl groups to epoxy groups is less than 0.9, the increase of the molecular weight by linear polymerization does not proceed, but crosslinking is caused by side reactions, resulting in a product insoluble in the solvent. When the ratio of phenolic hydroxyl groups to epoxy groups is more than 1.1, the increase of the molecular weight does not proceed sufficiently.

Although the quantity of the catalyst is not particularly limited, the catalyst, generally, is used in quantity of 0.0001 to 0.2 mol per 1 mol of the difunctional epoxy resin. When the quantity of the catalyst is less than the range, the increase of the molecular weight may be slowed down severely, and when it is larger than the range, side reactions may increase, thereby preventing the increase of the molecular weight by linear polymerization.

The preferred range of the reaction temperature is 60° to 150° C., more preferably 80° to 130° C. When the reaction temperature is lower than 60° C., the increase of the molecular weight may be slowed down severely, and when it is higher than 150° C., side reactions may increase, thereby preventing the Increase of the molecular weight by linear polymerization.

The solids concentration in the reaction system, namely the proportion of the total of the difunctional epoxy resin and the dihydric phenol based on the total of the difunctional epoxy resin, the dihydric phenol and the amide solvent, may generally be at most 90% by weight, preferably at most 50% by weight, more preferably at most 30% by weight. The higher the solids concentration is, the more the side reactions occur to make the increase of the molecular weight by linear polymerization difficult. When the polymerization is carried out with a relatively high solids concentration, lowering the reaction temperature and decreasing the quantity of the catalyst used make it possible to obtain linear ultra high molecular weight epoxy resins.

It is preferable to carry out the polymerization in an inert atmosphere, such as nitrogen gas.

The high molecular weight epoxy resin obtained by the method of the present invention is an ultra high molecular weight epoxy resin having film-forming property, and seeing that the films formed from the high molecular weight epoxy resin have satisfactory strength, it is conceivable that the high molecular weight epoxy resin is less branched and have a higher molecular weight than the conventional high molecular weight epoxy resins. The films which are formed from the high molecular weight epoxy resin prepared according to the present invention have excellent properties which cannot be exhibited by the films formed from the conventional high molecular weight epoxy resins, namely extremely high strength and extremely large elongation.

Another characteristic of the present invention is that the polymerization proceeds fast because of the use of the amide solvent as a polymerization solvent.

The present invention will be described in more detail with reference to tile following Examples. These Examples, however, are not to be construed to limit the scope of the invention.

EXAMPLES 1 TO 14 AND COMPARATIVE EXAMPLES 1 TO 4

Example 1

177.5 g of a bisphenol A epoxy resin (epoxy equivalent weight: 177.5) as a difunctional epoxy resin, 115.5 g of bisphenol A (hydroxyl equivalent weight: 115.5) as a dihydric phenol and 1.77 g of sodium hydroxide as an etherifying catalyst were dissolved in 683.7 g of N,N-dimethylformamide as an amide solvent to prepare a reaction solution having a solids concentration (the proportion of the total of the difunctional epoxy resin and the dihydric phenol based on the total of the difunctional epoxy resin, the dihydric phenol and the amide solvent) off 30% by weight. The temperature of the reaction system was maintained at 120° C. for 4 hours by placing the reaction system in an oil bath of 125° C. while the reaction solution was stirred by a mechanical means in tile atmosphere of nitrogen gas. This resulted in saturation of the viscosity of the reaction solution at 12,800 mPa.s, which meant the conclusion of the reaction. The weight average molecular weight of the obtained high molecular weight epoxy resin was 72,500 as determined by gel permeation chromatography and 59,200 as determined by light scattering method. Also the high molecular weight epoxy resin had a reduced viscosity of 0.770 dl/g.

The resultant reaction solution containing the high molecular weight epoxy resin was applied to a glass plate and dried at 200° C. for one hour to obtain an epoxy resin film of 37 μm thickness. The film had a tensile strength of 32.8 MPa, an elongation of 56.5% and a tensile modulus of 495 MPa. The film had a glass transition temperature of 77° C. and a heat decomposition temperature of 338° C.

Example 2

177.5 g of a bisphenol A epoxy resin (epoxy equivalent weight: 177.5) as a difunctional epoxy resin, 55.7 g of hydroquinone (hydroxyl equivalent weight: 55.7) as a dihydric phenol and 0.89 g of lithium hydroxide as an etherifying catalyst were dissolved in 702.3 g of N,N-dimethylacetamide as an amide solvent to prepare a reaction solution having a solids concentration (the proportion of the total of the difunctional epoxy resin and the dihydric phenol based on the total of the difunctional epoxy resin, the dihydric phenol and the amide solvent) of 25% by weight. The temperature or tile reaction system was maintained at 110° C. for 4 hours by placing the reaction system in an oil bath of 115° C. while the reaction solution was stirred by a mechanical means in the atmosphere of nitrogen gas. This resulted in saturation of tile viscosity of the reaction solution at 8,400 mPa.s, which meant the conclusion of the reaction. The weight average molecular weight of the obtained high molecular weight epoxy resin was 188,200 as determined by gel permeation chromatography and 153,900 as determined by light scattering method. Also the high molecular weight epoxy resin had a reduced viscosity of 1.042 dl/g.

The resultant reaction solution containing the high molecular weight epoxy resin was applied to a glass plate and dried at 200° C. for one hour to obtain an epoxy resin film of 28 μm thickness. The film had a tensile strength of 39.5 MPa, an elongation of 77.2% and a tensile modulus of 618 MPa. The film had a glass transition temperature of 86° C. and a heat decomposition temperature of 342° C.

Example 3

171.8 g of a bisphenol A epoxy resin (epoxy equivalent weight: 171.8) as a difunctional epoxy resin, 115.5 g of bisphenol A (hydroxyl equivalent weight: 115.5) as a dihydric phenol and 1.72 g of sodium methoxide as an etherifying catalyst were dissolved in 1156.1 g of N,N-dimethylacetamide as an amide solvent to prepare a reaction solution having a solids concentration (the proportion of the total of the difunctional epoxy resin and the dihydric phenol based on the total of the difunctional epoxy resin, the dihydric phenol and the amide solvent) of 20% by weight. The temperature of the reaction system was maintained at 120° C. for 2 hours by placing the reaction system in an oil bath of 125° C. while the reaction solution was stirred by a mechanical means in the atmosphere of nitrogen gas. This resulted In saturation of the viscosity of the reaction solution at 8,400 mPa.s, which meant the conclusion of the reaction. The weight average molecular weight of the obtained high molecular weight epoxy resin was 274,800 as determined by gel permeation chromatography and 231,600 as determined by light scattering method. Also the high molecular weight epoxy resin had a reduced viscosity of 1.105 dl/g.

The resultant reaction solution containing the high molecular weight epoxy resin was applied to a glass plate and dried at 200° C. for one hour to obtain an epoxy resin film of 25 μm thickness. The film had a tensile strength of 47.9 MPa, an elongation of 31.4% and a tensile modulus of 796 MPa. The film had a glass transition temperature of 112° C. and a heat decomposition temperature of 346° C.

Example 4

The procedure of Example 3 was repeated with the exception that 55.2 g of resorcinol was used in place of 115.5 g of bisphenol A and the amount of N,N-dimethylacetamide of 1156.1 g was changed to 914.9 g. This resulted in saturation of the viscosity of the reaction solution at 2,800 mPa.s three hours after the initiation of heating, which meant the conclusion of the reaction. The weight average molecular weight of the obtained high molecular weight epoxy resin was 451,000 as determined by gel permeation chromatography and 401,000 as determined by light scattering method. Also the high molecular weight epoxy resin had a reduced viscosity of 1.250 dl/g.

The resultant reaction solution containing the high molecular weight epoxy resin was applied to a glass plate and dried at 200° C. for one hour to obtain an epoxy resin film of 17 μm thickness. The film had a tensile strength of 34.5 MPa, an elongation of 139% and a tensile modulus of 466 MPa. The film had a glass transition temperature of 83° C. and a heat decomposition temperature of 340° C.

Example 5

The procedure of Example 3 was repeated with the exception that 1156.1 g of N-methylpyrrolidone was used in place of 1156.1 g of N,N-dimethylacetamide. This resulted in saturation of the viscosity of the reaction solution at 3,700 mPa.s 2.5 hours after the initiation of the reaction, which meant the conclusion of the reaction. The weight average molecular weight of the obtained high molecular weight epoxy resin was 115,000 as determined by gel permeation chromatography and 102,000 as determined by light scattering method. Also the high molecular weight epoxy resin had a reduced viscosity of 0.890 dl/g.

The resultant reaction solution containing the high molecular weight epoxy resin was applied to a glass plate and dried at 200° C. for one hour to obtain an epoxy resin film of 13 μm thickness. The film had a tensile strength of 46.1 MPa, an elongation of 67% and a tensile modulus of 618 MPa. The film had a glass transition temperature of 104° C. and a heat decomposition temperature of 344° C.

Example 6

The procedure of Example 3 was repeated with the exception that 1156.1 g of N-methylacetamide was used in place of 1156.1 g of N,N-dimethylacetamide. This resulted in saturation of the viscosity of the reaction solution at 1,050 mPa.s four hours after the initiation of heating, which meant the conclusion of the reaction. The weight average molecular weight of the obtained high molecular weight epoxy resin was 73,000 as determined by gel permeation chromatography and 72,000 as determined by light scattering method. Also the high molecular weight epoxy resin had a reduced viscosity of 0.725 dl/g.

The resultant reaction solution containing the high molecular weight epoxy resin was applied to a glass plate and dried at 200° C. for one hour to obtain an epoxy resin film of 15 μm thickness. The film had a tensile strength of 18.5 MPa, an elongation of 28% and a tensile modulus of 234 MPa. The film had a glass transition temperature of 98° C. and a heat decomposition temperature of 339° C.

Example 7

The procedure of Example 3 was repeated with the exception that 1.14 g of lithium methoxide was used in place of 1.72 g of sodium methoxide. This resulted in saturation of the viscosity of the reaction solution at 9,800 mPa.s 2.5 hours after the Initiation of heating, which meant the conclusion of the reaction. The weight average molecular weight of the obtained high molecular weight epoxy resin was 295,000 as determined by gel permeation chromatography and 260,000 as determined by light scattering method. Also the high molecular weight epoxy resin had a reduced viscosity of 1.010 dl/g.

The resultant reaction solution containing the high molecular weight epoxy resin was applied to a glass plate and dried at 200° C. for one hour to obtain an epoxy resin film of 13 μm thickness. The film had a tensile strength of 51.1MPa, an elongation of 47% and a tensile modulus of 679 MPa. The film had a glass transition temperature of 110° C. and a heat decomposition temperature of 344° C.

Example 8

171.3 g of a bisphenol A epoxy resin (epoxy equivalent weight: 171.3) as a difunctional epoxy resin, 80.08 g of 1,5-naphthalenediol (hydroxyl equivalent weight: 80.08) as a dihydric phenol and 0.72 g of lithium hydroxide as an etherifying catalyst were dissolved in 756.3 g of N-methylpyrrolidone as an amide solvent to prepare a reaction solution having a solids concentration (the proportion of the total of the difunctional epoxy resin and the dihydric phenol based on the total of the difunctional epoxy resin, the dihydric phenol and the amide solvent) of 25% by weight. The temperature of the reaction system was maintained at 100° C. for 4 hours by placing the reaction system in an oil bath of 110° C. while the reaction solution was stirred by a mechanical means In the atmosphere of nitrogen gas. This resulted in saturation of the viscosity of the reaction solution at 8,680 mPa.s, which meant the conclusion of the reaction. The weight average molecular weight of the obtained high molecular weight epoxy resin was 708,000 as determined by gel permeation chromatography and 387,000 as determined by light scattering method. Also the high molecular weight epoxy resin had a reduced viscosity of 1.180 dl/g.

The resultant reaction solution containing the high molecular weight epoxy resin was applied to a glass plate and dried at 200° C. for one hour to obtain an epoxy resin film of 38 μm thickness. The film had a tensile strength of 43.2 MPa, an elongation of 61.0% and a tensile modulus of 435 MPa. The film had a glass transition temperature of 124° C. and a heat decomposition temperature of 355° C.

Example 9

171.3 g of a bisphenol A epoxy resin (epoxy equivalent weight: 171.3) as a difunctional epoxy resin, 80.08 g of 1,7-naphthalenediol (hydroxyl equivalent weight: 80.08) as a dihydric phenol and 1.20 g of sodium hydroxide as an etherifying catalyst were dissolved in 1010 g of N,N-dimethylacetamide as an amide solvent to prepare a reaction solution having a solids concentration (the proportion of the total of the difunctional epoxy resin and the dihydric phenol based on the total of the difunctional epoxy resin, the dihydric phenol and the amide solvent) of 20% by weight. The temperature of the reaction system was maintained at 110° C. for 8 hours by placing the reaction system in an oil bath of 115° C. while the reaction solution was stirred by a mechanical means in the atmosphere of nitrogen gas. Consequently, a solution of a high molecular weight epoxy resin having a viscosity of 3,054 mPa.s was obtained. The weight average molecular weight of the high molecular weight epoxy resin was 414,000 as determined by gel permeation chromatography and 288,000 as determined by light scattering method. Also the high molecular weight epoxy resin had a reduced viscosity of 1.10 dl/g.

The resultant reaction solution containing the high molecular weight epoxy resin was applied to a glass plate and dried at 200° C. for one hour to obtain an epoxy resin film of 39 μm thickness. The film had a tensile strength of 45.0 MPa, an elongation of 54.0% and a tensile modulus of 420 MPa. The film had a glass transition temperature of 120° C. and a heat decomposition temperature of 355° C.

Example 10

177.5 g of a bisphenol A epoxy resin (epoxy equivalent weight: 177.5) as a difunctional epoxy resin, 115.5 g of bisphenol A (hydroxyl equivalent weight: 115.5) as a dihydric phenol and 1.13 g or sodium borohydride as an etherifying catalyst were dissolved in 882.4 g of N-methylpyrrolidone as an amide solvent to prepare a reaction solution having a solids concentration (the proportion of the total of the difunctional epoxy resin and the dihydric phenol based on the total of the difunctional epoxy resin, the dihydric phenol and the amide solvent) of 25% by weight. The temperature of the reaction system was maintained at 120° C. for 4 hours by placing the reaction system in an oil bath of 125° C. while the reaction solution was stirred by a mechanical means in the atmosphere of nitrogen gas. Consequently, a solution of a high molecular weight epoxy resin having a viscosity of 3,680 mPa.s was obtained. The weight average molecular weight of the obtained high molecular weight epoxy resin was 108,000 as determined by gel permeation chromatography and 87,000 as determined by light scattering method. Also the high molecular weight epoxy resin had a reduced viscosity of 0.805 dl/g.

The resultant reaction solution containing the high molecular weight epoxy resin was applied to a glass plate and dried at 200° C. for one hour to obtain an epoxy resin film of 33 μm thickness. The film had a tensile strength of 37.2 MPa, an elongation of 55.0% and a tensile modulus of 410 MPa. The film had a glass transition temperature of 103° C. and a heat decomposition temperature of 345° C.

Example 11

171.3 g of a bisphenol A epoxy resin (epoxy equivalent weight: 171.3) as a difunctional epoxy resin, 55.4 g of resorcinol (hydroxyl equivalent weight: 55.4) as a dihydric phenol and 1.13 g of lithium hydroxide as an etherifying catalyst were dissolved in 683.5 g of N,N-dimethylformamide as an amide solvent to prepare a reaction solution having a solids concentration (the proportion of the total of the difunctional epoxy resin and the dihydric phenol based on the total of the difunctional epoxy resin, the dihydric phenol and the amide solvent) of 25% by weight. The temperature of the reaction system was maintained at 110° C. for 4 hours by placing the reaction system in an oil bath of 115° C. while the reaction solution was stirred by a mechanical means in the atmosphere of nitrogen gas. Consequently, a solution of a high molecular weight epoxy resin having a viscosity of 3,054 mPa.s was obtained. The weight average molecular weight of the obtained high molecular weight epoxy resin was 114,000 as determined by gel permeation chromatography and 84,600 as determined by light scattering method. Also the high molecular weight epoxy resin had a reduced viscosity of 0.812 dl/g.

The resultant reaction solution containing the high molecular weight epoxy resin was applied to a glass plate and dried at 200° C. for one hour to obtain an epoxy resin film of 34 μm thickness. The film had a tensile strength of 42.0 MPa, an elongation of 48.0% and a tensile modulus of 370 MPa. The film had a glass transition temperature of 80° C. and a heat decomposition temperature of 345° C.

Example 12

173.2 g of a bisphenol A epoxy resin (epoxy equivalent weight; 173.2) as a difunctional epoxy resin, 55.8 g of hydroquinone (hydroxyl equivalent weight: 55.3) as a dihydric phenol and 4.81 g of tri-n-propylphosphine as an etherifying catalyst were dissolved in 933.2 g of N,N-dimethylacetamide as an amide solvent to prepare a reaction solution having a solids concentration (the proportion of the total of the difunctional epoxy resin and the dihydric phenol based on the total of the difunctional epoxy resin, the dihydric phenol and the amide solvent) of 20% by weight. The temperature of the reaction on system was maintained at 120° C. for 12 hours by placing the reaction system in an oil bath of 125° C. while the reaction solution was stirred by a mechanical means in the atmosphere of nitrogen gas. Consequently, a solution of a high molecular weight epoxy resin having a viscosity of 1,920 mPa.s was obtained. The weight average molecular weight of the obtained high molecular weight epoxy resin was 108,000 as determined by gel permeation chromatography and 87,500 as determined by light scattering method. Also the high molecular weight epoxy resin had a reduced viscosity of 0.890 dl/g.

The resultant reaction solution containing the high molecular weight epoxy resin was applied to a glass plate and dried at 200 for one hour to obtain an epoxy resin film of 28 μm thickness. The film had a tensile strength of 36.7 MPa, an elongation of 43.2% and a tensile modulus of 392 MPa. The film had a glass transition temperature of 78° C. and a heat decomposition temperature of 348° C.

Example 13

177.5 g of a bisphenol A epoxy resin (epoxy equivalent weight: 177.5) as a difunctional epoxy resin, 115.5 g of bisphenol A (hydroxyl equivalent weight: 115.5) as a dihydric phenol and 3.04 g of 1,8-diazabicyclo[5.4.0]7-undecene as an etherifying catalyst were dissolved in 689.6 g of N,N-dimethylacetamide as an amide solvent to prepare a reaction solution having a solids concentration (the proportion of the total of the difunctional epoxy resin and the dihydric phenol based on the total of the difunctional epoxy resin, the dihydric phenol and the amide solvent) of 30% by weight. The temperature of the reaction system was maintained at 100° C. for 6 hours by placing the reaction system in an oil bath of 110° C. while the reaction solution was stirred by a mechanical means in the atmosphere of nitrogen gas. Consequently, a solution of a high molecular weight epoxy resin having a viscosity of 2,816 mPa.s was obtained. The weight average molecular weight of the obtained high molecular weight epoxy resin was 105,000 as determined by gel permeation chromatography and 89,000 as determined by light scattering method. Also the high molecular weight epoxy resin had a reduced viscosity of 0.905 dl/g.

The resultant reaction solution containing the high molecular weight epoxy resin was applied to a glass plate and dried at 200° C. for one hour to obtain an epoxy resin film of 32 μm thickness. The film had a tensile strength of 44.0 MPa, an elongation of 38.9% and a tensile modulus of 410 MPa. The film had a glass transition temperature of 100° C. and a heat decomposition temperature of 347° C.

Example 14

177.5 g of a bisphenol A epoxy resin (epoxy equivalent weight: 177.5) as a difunctional epoxy resin, 55.4 g of resorcinol (hydroxyl equivalent weight: 55.4) as a dihydric phenol and 2.48 g of 1,5-diazabicyclo[4.3.0]-5nonene as an etherifying catalyst were dissolved in 706.1 g of N-methylpyrrolidone as an amide solvent to prepare a reaction solution having a solids concentration (the proportion of the total of the difunctional epoxy resin and the dihydric phenol based on the total of the difunctional epoxy resin, the dihydric phenol and the amide solvent) of 25% by weight. The temperature of the reaction system was maintained at 110° C. for 6 hours by placing the reaction system in an oil bath of 115° C. while the reaction solution was stirred by a mechanical means in the atmosphere of nitrogen gas. Consequently, a solution of a high molecular weight epoxy resin having a viscosity 8,580 mPa.s was obtained. The weight average molecular weight of the obtained high molecular weight epoxy resin was 120,000 as determined by gel permeation chromatography and 104,000 as determined by light scattering method. Also the high molecular weight epoxy resin had a reduced viscosity of 0.912 dl/g.

The resultant reaction solution containing the high molecular weight epoxy resin was applied to a glass plate and dried at 200° C. for one hour to obtain an epoxy resin film of 30 μm thickness. The film had a tensile strength of 40.0 MPa, an elongation of 38.4% and a tensile modulus of 385 MPa. The film had a glass transition temperature of 81° C. and a heat decomposition temperature of 340° C.

The effects of the present invention taken in these Examples are confirmed by the following Comparative Examples.

Comparative Example 1

The procedure of Example 3 was repeated with the exception that the quantity of bisphenol A of 115.5 g (1.00 equivalent to the epoxy resin used) was changed to 80.9 g (0.7 equivalents to the epoxy resin used), and the quantity of N,N-dimethylacetamide of 1156.1 g was changed to 1017.5 g. This resulted In the occurrence of gelation one hour after the initiation of the reaction, and the reactants became insoluble in the solvent.

Comparative Example 2

The procedure of Example 3 was repeated with the exception that the quantity of bisphenol A of 115.5 g (1.00 equivalent to the epoxy resin used) was changed to 80.9 g (0.7 equivalents to the epoxy resin used), and the quantity of N,N-dimethylacetamide of 1156.1 g was changed to 1017.5 g. In this Comparative Example, heating was ended before gelation occurred to obtain a high molecular weight epoxy resin solution having a viscosity of 280 mPa.s. The weight average molecular weight of the obtained high molecular weight epoxy resin was 110,000 as determined by gel permeation chromatography and 98,000 as determined by light scattering method. Also the high molecular weight epoxy resin had a reduced viscosity of 0.425 dl/g.

The obtained high molecular weight epoxy resin solution was applied to a glass plate and dried at 200° C. for one hour, but no epoxy resin films of not more than 50 μm having sufficient strength tolerable for handling were obtained.

Comparative Example 3

The procedure of Example 3 was repeated with the exception that methyl ethyl ketone was used in place of N,N-dimethylformamide, but the viscosity of the reaction solution was increased no more than 2.0 mPa.s even 8 hours after the initiation of heating. The weight average molecular weight of the obtained resin was 2,600 as determined by gel permeation chromatography, but could not be determined by light scattering method. The resultant reaction solution containing the epoxy resin was applied to a glass plate and dried at 200° C., for one hour, but an epoxy resin film could not be obtained.

Comparative Example 4

The procedure of Example 3 was repeated with the exception that ethylene glycol monomethyl ether was used in place of N,N-dimethylacetamide, but the viscosity of the reaction solution was increased no more than 73.2 mPa.s even 8 hours after the initiation of heating. The weight average molecular weight of the obtained resin was 18,600 as determined by gel permeation chromatography, but could not be determined by light scattering method. The obtained high molecular weight epoxy resin solution was applied to a glass plate and dried at 200° C. for one hour, but no epoxy resin films of not more than 50 μm having sufficient strength tolerable to handling were obtained.

Hereinafter, the methods of measurements carried out in the Examples and Comparative Examples are described.

Viscosities of the reaction solutions were measured by using an EMD-model viscometer (produced by Tokyo Keiki Co., Ltd.).

The reduced viscosities were measured in N,N-dimethylacetamide as a solvent at a concentration of 0.1 g/dl to 0.5 g/dl at 30° C.

Gel permeation chromatography was conducted by using a column of TSK gel G6000+G5000+G4000+G3000+G2000. N,N-dimethylacetamide was used as an eluent, with the concentration of samples adjusted to 2% by weight. After the relationship between molecular weights and elution time was obtained by using polystyrenes having various molecular weights, the molecular weights of samples were calculated from their elution time as a styrene-conversion weight average molecular weight.

The photometer used in the determination of the weight average molecular weights by light scattering method was a DLS-700 produced by Ohtuka Electronics Co., Ltd.

Measurements of tensile strength, elongation and tensile modulus were conducted by using TENSILON produced by Orientic Co., Ltd. The samples of films had a size of 50×10 mm, and the tensile speed was 5 mm/min.

The glass transition temperatures (Tg) were measured by using a 910 differential scanning calorimeter (DSC) produced by E. I. Du Pont de Nemours and Company.

The heat decomposition temperature is the temperature for onset of reduction in weight in the air which was measured by using a differential thermobalance, TGD-3000, produced by ULVAC Corp.

As shown in Comparative Example 2, it is conceivable that the occurrence of branching was increased by the presence of an excessive quantity of the epoxy resin, and no films having a thickness of 50 μm or less could be formed in spite of the fairly high molecular weight increased up to 100,000.

Further, as shown in Comparative Examples 3 and 4, when solvents other than amide solvents were used, ultra high molecular weight epoxy resins could not be obtained, and no films could be formed.

On the contrary to Comparative Examples, epoxy resin films having a thickness of less than 50 μm and sufficient strength could be obtained in all Examples.

As described above, the method of producing high molecular weight epoxy resins according to the present invention makes it possible to produce ultra high molecular weight epoxy resins able to be formed into epoxy resin films which could not be obtained heretofore, have sufficiently thin thickness of 100 μm or less, particularly 50 μm or less, and are sufficient in strength. Also, according to the method of the present invention, such ultra high molecular weight epoxy resins can be obtained in a short time.

What is claimed is,

1. A method of producing a high molecular weight epoxy resin, comprising polymerizing a difunctional epoxy resin having two epoxy groups per molecule and a dihydric phenol at a reaction temperature of 60° to 150° C. by heating the difunctional epoxy resin and the dihydric phenol which are present in quantities which provide a ratio of phenolic hydroxy groups to epoxy groups of from 1:0.9 to 1:1.1 in an amide solvent, in the presence of an alkali metal compound as a polymerization catalyst, the total of the difunctional epoxy resin and the dihydric phenol being at most 30% by weight based on a total of the difunctional epoxy resin, the dihydric phenol and the amide solvent, the amount of the alkali metal compound being 0.0001 to 0.2 mol per mol of the difunctional epoxy resin, the amide solvent being selected from the group consisting of N,N-dimethylformamide, N-methylacetamide, N,N-dimethylacetamide, N-methylpyrrolidone and a mixture thereof, and the alkali metal compound being selected from the group consisting of sodium hydroxide, sodium methoxide, sodium hydride, sodium borohydride, lithium hydroxide, lithium methoxide, lithium hydride, lithium borohydride and a mixture thereof.

2. The method as claimed in claim 1, wherein the amide solvent is N,N-dimethylacetamide.

3. The method as claimed in claim 1, wherein the amide solvent is N,N-dimethylformamide.

4. The method as claimed in claim 1, wherein the amide solvent is N-methylpyrrolidone.

5. The method as claimed in claim 1, wherein the difunctional epoxy resin is selected from the group consisting of bisphenol A epoxy resin, a derivative thereof that is halogenated or hydrogenated in an aromatic ring, bisphenol F epoxy resin, a derivative thereof that is halogenated or hydrogenated in an aromatic ring, bisphenol S epoxy resin, a derivative thereof that is halogenated or hydrogenated in aromatic ring, an alicyclic epoxy resin, a derivative thereof that is halogenated in an alicyclic ring, a diglycidyl ether of a dihydric phenol and a derivative thereof that is halogenated or hydrogenated in an aromatic ring.

6. The method as claimed in claim 5, wherein the difunctional epoxy resin is bisphenol A epoxy resin.

7. The method as claimed in claim 1, wherein the dihydric phenol is selected from the group consisting of hydroquinone, a derivative thereof that is halogenated or alkyl-substituted in an aromatic ring, resorcinol, a derivative thereof that is halogenated or alkyl-substituted in an aromatic ring, catechol, a derivative thereof that is halogenated or alkyl-substituted in an aromatic ring, bisphenol A, a derivative thereof that is halogenated or alkyl-substituted in an aromatic ring, bisphenol F, and a derivative thereof that is halogenated or alkyl-substituted in an aromatic ring.

8. The method as claimed in claim 7, wherein the dihydric phenol is selected from the group consisting of hydroquinone, resorcinol and bisphenol A.

9. The method as claimed in claim 1, wherein the dihydric phenol is a naphthalenediol selected from the group consisting of 1,4-naphthalenediol, a derivative thereof that is halogenated or alkyl-substituted in an aromatic ring, 1,5-naphthalenediol, a derivative thereof that is halogenated or alkyl-substituted in an aromatic ring, 1,6-naphthalenediol, a derivative thereof that is halogenated or alkyl-substituted in an aromatic ring, 1,7-naphthalendiol, a derivative thereof that is halogenated or alkyl-substituted in an aromatic ring, 2,7-napthalenediol, and a derivative thereof that is halogenated or alkyl-substituted in an aromatic ring.

10. The method as claimed in claim 9, wherein the dihydric phenol is 1,5-naphthalenediol or 1,7-naphthalene diol.

11. The method as claimed in claim 1, wherein the difunctional epoxy resin is bisphenol A epoxy resin, the dihydric phenol is selected from the group consisting of hydroquinone, resorcinol, bisphenol A, 1,5-naphthalenediol and 1,7-naphthalenediol, and the amide solvent is selected from the group consisting of N,N-dimethylacetamide, N,N-dimethylformamide and N-methylpyrrolidone.

12. The method as claimed in any one of claims 1, or 11 wherein the polymerization of the difunctional epoxy resin and the dihydric phenol proceeds linearly.

13. A method as claimed in claim 1, wherein polymerization is continued until saturation of the viscosity of the reaction solution, indicating conclusion of the polymerization reaction.

* * * * *